March 6, 1956     J. B. MacNEILL ET AL     2,737,556
CIRCUIT INTERRUPTER Filed April 27, 1951     5 Sheets-Sheet 1

WITNESSES:

INVENTORS
John B. MacNeill and
Benjamin P. Baker
BY
Ralph H. Swingle
ATTORNEY

March 6, 1956    J. B. MacNEILL ET AL    2,737,556
CIRCUIT INTERRUPTER
Filed April 27, 1951    5 Sheets-Sheet 3

INVENTORS
John B. MacNeill and
Benjamin P. Baker.
BY
Ralph H. Swingle
ATTORNEY

March 6, 1956  J. B. MacNEILL ET AL  2,737,556
CIRCUIT INTERRUPTER
Filed April 27, 1951  5 Sheets-Sheet 4

WITNESSES:
Robert Bird
W. R. Crout

INVENTORS
John B. MacNeill and
Benjamin P. Baker.
BY
Ralph H. Swingle
ATTORNEY

March 6, 1956  J. B. MacNEILL ET AL  2,737,556
CIRCUIT INTERRUPTER
Filed April 27, 1951  5 Sheets-Sheet 5

WITNESSES:
E. G. McCloskey.
W. R. Crout

INVENTORS
John B. MacNeill and
Benjamin P. Baker.
BY
Ralph H. Swingle
ATTORNEY

United States Patent Office 2,737,556
Patented Mar. 6, 1956

2,737,556

CIRCUIT INTERRUPTER

John B. MacNeill, Wilkinsburg, and Benjamin P. Baker, Turtle Creek, Pa., assignors to Westinghouse Electric Corporation, East Pittsburgh, Pa., a corporation of Pennsylvania Application April 27, 1951, Serial No. 223,362

16 Claims. (Cl. 200—150)

This invention relates to circuit interrupters, in general, and more particularly to interrupting switches.

High voltage distribution systems through thinly settled regions frequently have to deliver small isolated blocks of power, which necessitated the uneconomical use of expensive protective equipment consisting of high kva. circuit breakers and disconnects.

It is a general object of our invention to provide an improved relatively low kva., specially constructed power circuit breaker in combination with a disconnect switch. The functions of fault protection, switching and disconnecting are all controlled by one operating means, which may be motor operated or manually operated.

A more specific object of our invention is to provide an improved operating arrangement for a circuit interrupter, which may either be used in connection with circuit breakers alone, or used in a circuit breaker employed in conjunction with a suitably operated serially related disconnect switch.

Still another object is to provide an improved piston operating arrangement utilized in conjunction with our improved circuit breaker operating mechanism.

Another object is to provide an improved relatively low-power interrupting switch, that is a disconnecting switch in combination with a low-power interrupting device, in which the actuation of the operating parts is sequentially controlled in a proper manner. Preferably the speed of separation of the interrupting contacts, between which an arc is drawn and extinguished, is independent of the speed of operation of the operating mechanism for the switch.

Further objects and advantages will readily become apparent upon reading the following specification, taken in conjunction with the drawings, in which.

Figures 1, 20:
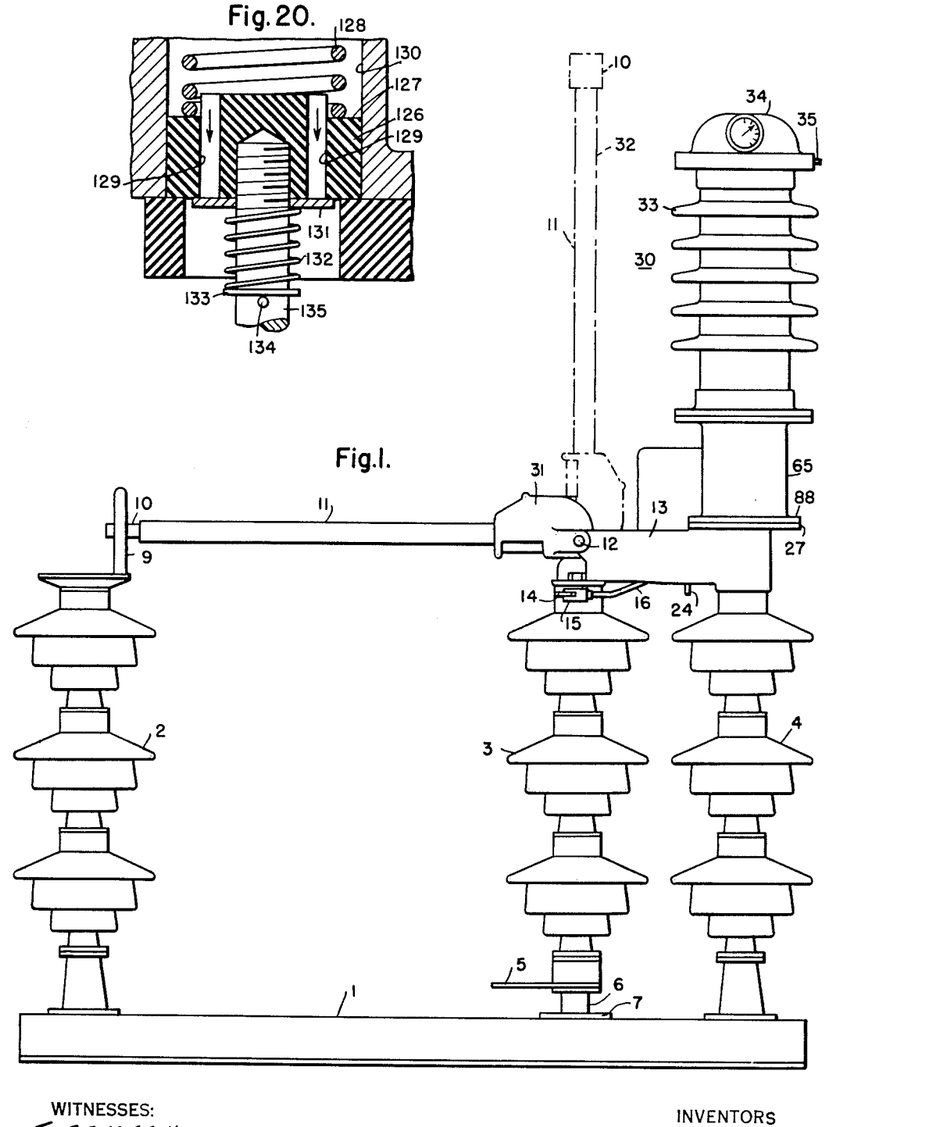
Figure 1 is a side elevational view of our improved circuit interrupter, the contact structure being shown by the full lines in the closed circuit position.
Fig. 20 is an enlarged vertical sectional fragmentary view through our improved piston member.

Referring to the drawings, and more particularly to Fig. 1 thereof, the reference numeral 1 designates a frame support, which may be of a channel-shaped configuration. Extending upwardly from the frame support 1 are three stacks of insulators 2-4, the end stacks 2 and 4 being stationary and the middle insulator stack 3 being rotatable. Preferably, a crank arm 5 is attached to the lower end of the insulator stack 3. The crank arm 5 may be rotated either manually or by a suitable motor driven mechanism. The rotatable insulator stack 3 is mounted upon a vertical shaft 6, which is journalled within a suitable bearing 7 fixedly supported in the frame support 1.

The end insulator stack 2 fixedly supports a pair of stationary jaw contacts 9, which, in the closed circuit position of the interrupter as shown in Fig. 1, electrically engage the end 10 of a disconnect switch blade 11. The disconnect switch blade 11 is pivotally mounted about the pivot pins 12 supported on a mechanism housing 13. The mechanism housing 13 is supported by the upper end of the rotatable insulator stack 3 and by the stationary insulator stack 4.

Fixed to the upper end of the rotatable insulator stack 3 is a crank arm 14 (Fig. 3) which is pivotally connected, as at 15, to a connecting rod 16, the latter serving to rotate a cam support 17 having a crank arm 18 affixed thereto.

Figure 3:
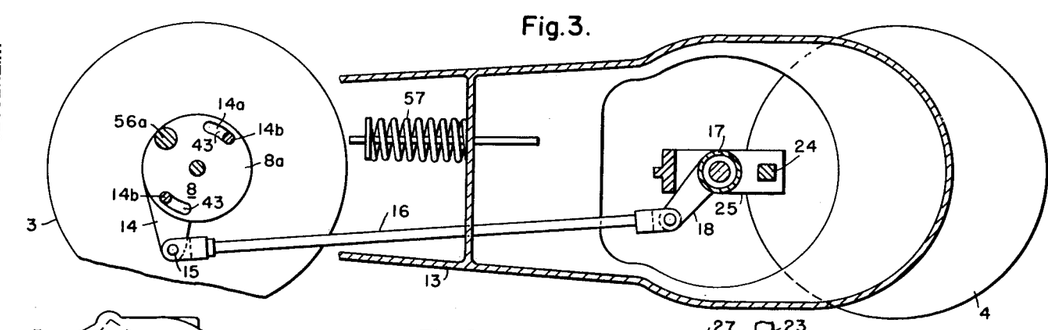
Fig. 3 is a plan view, partially in section, of the mechanism disclosed in Fig. 2.

Thus, rotation of the rotatable insulator stack 3, by actuation of the crank arm 5, effects counterclockwise rotation of the crank arm 14, as viewed in Fig. 3, to effect thereby through the connecting rod 16 counterclockwise rotation of the cam support 17.

A cam slot 19 rigidly affixed to the cam support 17 guides a cam follower 20, the latter being supported on a vertically movable actuating rod 22, the latter including a pair of axially aligned operating rods 23, 24, and a vertically extending section 26 welded thereto. The lower operating rod 24 is journalled within a bracket 25, the latter affixed, as by welding, to the mechanism housing 13.

Figures 4, 5, 6, 7:
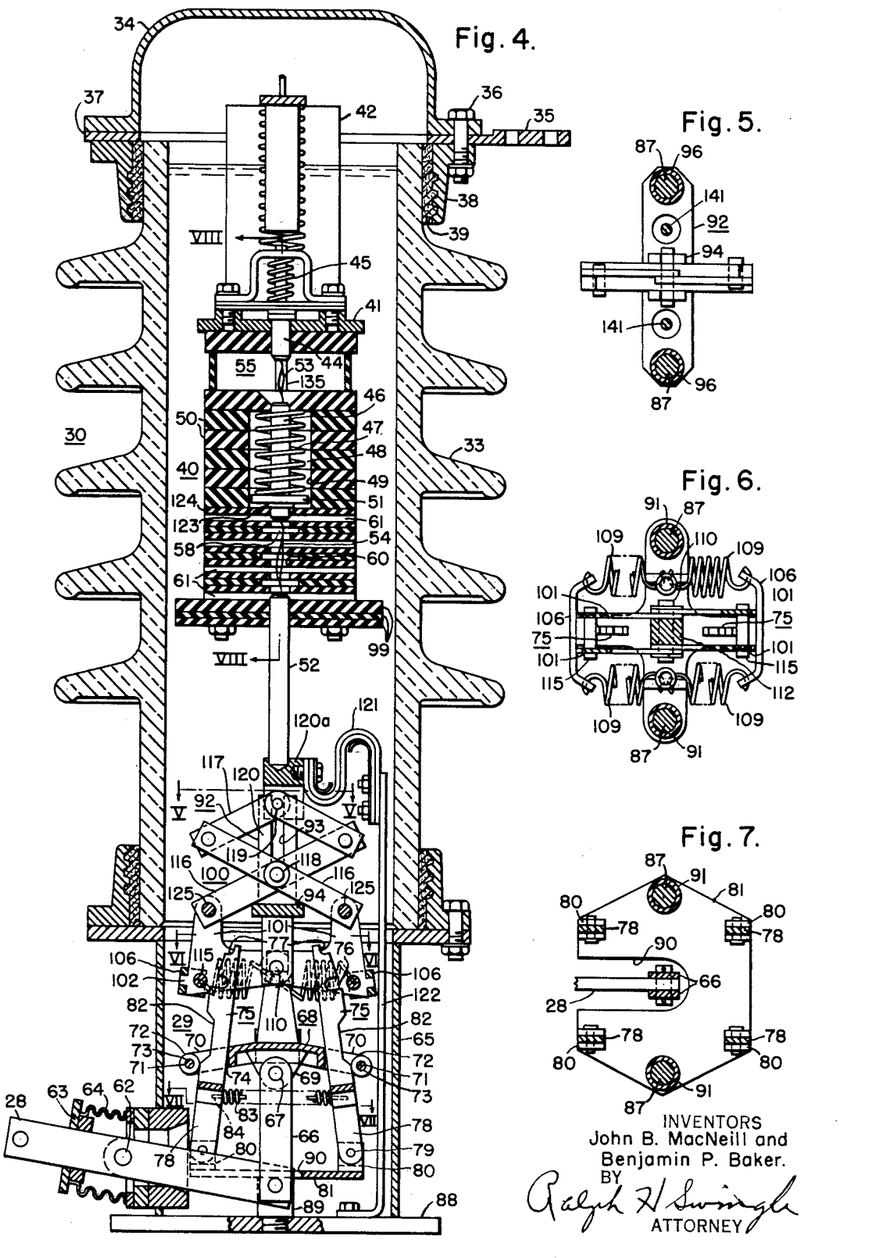
Fig. 4 is a vertical sectional view of our improved circuit breaker, the contact structure and operating mechanism being shown in the open circuit position.
Figs. 5 through 7 are sectional views taken along the corresponding lines of Fig. 4.

The upper operating rod 23 is journalled within the top plate 27 of the casting 13, and is pivotally connected to an operating arm 28, more clearly shown in Fig. 4.

The rotation of the operating arm 28 effects the actuation of the operating mechanism 29 disposed within a circuit interrupter, generally designated by the reference numeral 30, and fixedly supported at the upper end of the housing casting 13, as shown in Fig. 1.

Operation of the crank arm 5 to effect rotation of the rotatable insulator stack 3 not only effects operation of the mechanism 29 within the circuit interrupter 30 as hereinbefore described, but also effects through suitable mechanism, forming per se no part of our invention, disposed within the housing 31, twisting motion of the switch blade 11 followed by upward swinging opening motion of the switch blade 11.

The mechanism disposed within the housing 31 is preferably of the type set out and claimed in United States Patent 2,436,296, issued February 17, 1948, and assigned to the assignee of the instant application. Reference may be had to the aforesaid patent for a complete description of such mechanism, and for a full understanding of its operation. Briefly, this mechanism, set out in the aforesaid patent, first causes an axial rotation or twisting of the switch blade 11 to release the high contact pressure at contact 9 and to break any ice formations between the contacts 9 and 10, and then subsequently, following such axial rotation of the switch blade 11, this mechanism functions to swing the switch blade 11 upwardly to the dot-dash position 32 of Fig. 1. Consequently, the position 32 of Fig. 1 illustrates the fully open-circuit position of the interrupter. The closing operation goes through the same sequence in reverse order.

Figure 2:
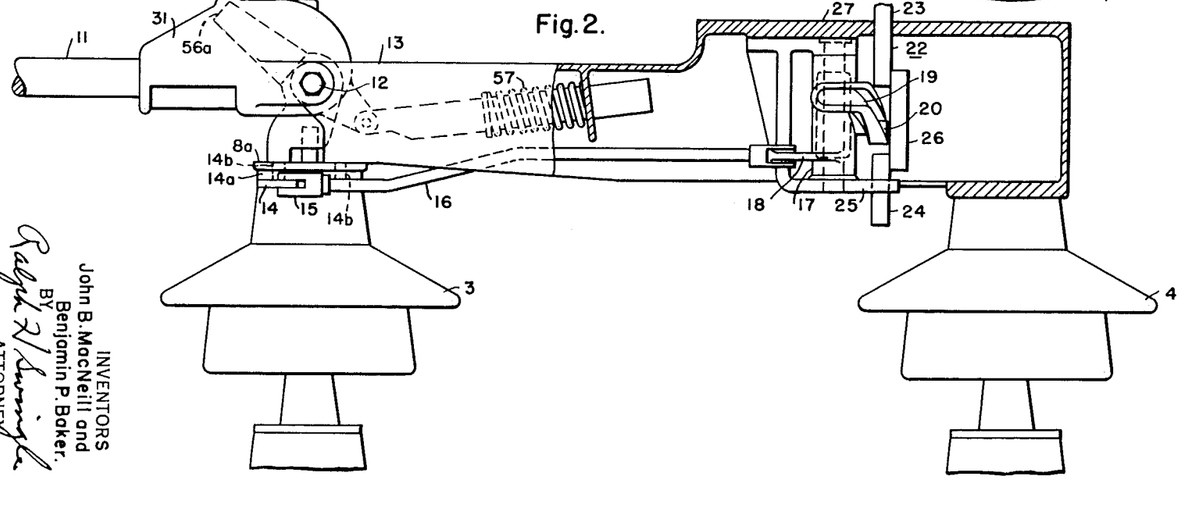
Fig. 2 is an enlarged side elevational view, partially in section, of a portion of the mechanism which actuates the circuit interrupter mechanism and also operates the mechanism for the disconnecting switch, the contact structure being shown in the closed circuit position.

More specifically, the crank arm 14 at the top of rotating insulator column 3, is an integral part of a rotatable plate 14a (Fig. 2). The rotatable plate 14a has a pair of upstanding actuating pins 14b integrally formed therewith. The pins 14b have a lost-motion connection 8 with the slots 43 formed in the base portion 8a of a rotatable angular crank 56a. The drive crank 56a corresponds to the drive crank 56 of the aforesaid Patent 2,436,296, to which reference may be had for details of its operation and function.

Referring to Fig. 4, it will be observed that the circuit interrupter 30 is enclosed within a ceramic cylinder 33 having one or more petticoats formed externally thereof to increase the surface breakdown path. At the upper end of the casing 33 is a cap 34 of metallic material to which a line terminal 35 may be clamped by one or more bolts 36. Preferably, the line terminal 35 is integrally formed with a ring-shaped plate 37, the latter being connected by the bolts 36 to a flange 38. The flange 38 may be secured to the upper end of the casing 33 by a cement 39.

Figures 8, 9, 10:
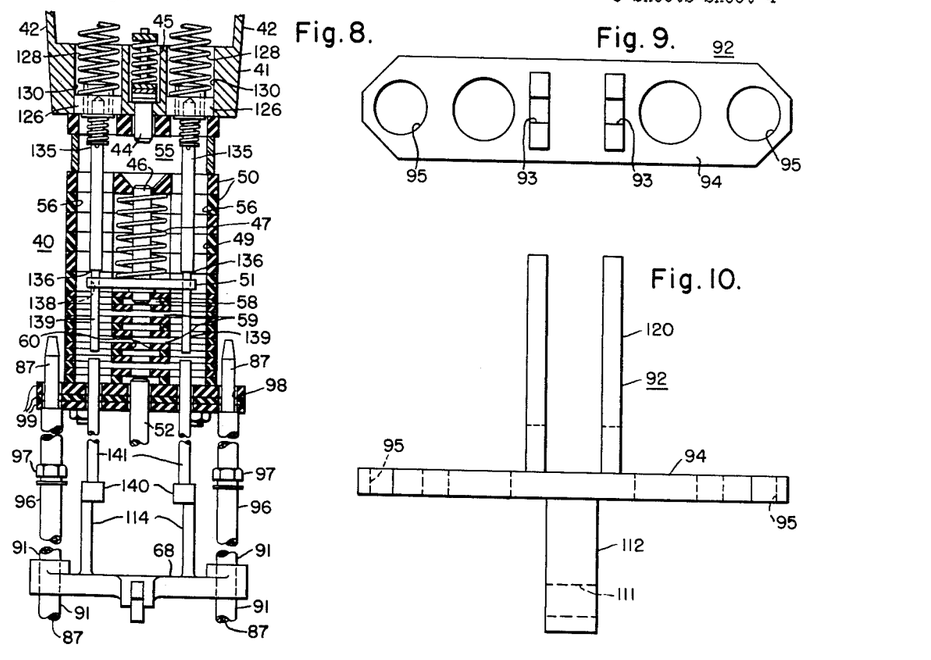
Fig. 8 is a vertical sectional view taken along the line VIII—VIII of Fig. 4, the contact structure being shown in the open circuit position, and the means for operating the pistons being illustrated.
Fig. 9 is a plan view of the guide support member illustrated in Fig. 10.
Fig. 10 is a side elevational view of the guide support member of Fig. 9.

Depending interiorly within the casing 33 is an arc-extinguishing unit, generally designated by the reference numeral 40. At the upper end of the arc-extinguishing unit 40 is a casting support 41, which has a pair of opposed upwardly extending hook extensions 42 (Fig. 8). The hook portions, not shown, of the two opposed hook extensions 42 are secured under the ring-shaped plate 37 to thereby support the unit 40 fixedly within the casing 33. Also, by a removal of the plurality of bolts 36, the cap 34 and the ring-shaped plate 37 may be removed. Following such removal, the arc-extinguishing unit 40 may be removed upwardly completely out of the casing 33 for inspection or repair.

The arc-extinguishing unit 40 includes a stationary contact 44, which is preferably resiliently mounted by means of a compression spring 45. An intermediate contact 46 makes abutting engagement with the stationary contact 44 in the closed circuit position, not shown. The intermediate contact 46 is biased downwardly by a compression spring 47, the latter being disposed within a space 48 formed by the alignment of slots 49 provided in a plurality of plates 50. The lower end of the compression spring 47 seats upon a spring plate 51, the latter being secured to and movable with the intermediate contact 46.

Engaging the lower end of the intermediate contact 46 is a lower movable rod-shaped interrupting contact 52. The separation of the intermediate contact 46 from the stationary contact 44 establishes a pressure-generating arc 53, shown, for illustrative purposes, in Fig. 4, even though said figure illustrates the open position of the interrupter. Also an interrupting arc 54 is established between the interrupting contacts 52, 46, being illustrated in Fig. 4 for illustrative purposes, even though said figure shows the fully open circuit position of the parts.

Oil fills the casing 33 to a level above the unit 40, so that establishment of a pressure-generating arc 53 within a pressure-generating chamber 55 forces oil to flow downwardly under pressure through two opposed vertical flow passages 56, more clearly shown in Fig. 8, and provided upon the alignment of slots 49 suitably formed in the plates 50. The oil passing downwardly through the vertical flow passages 56 passes into the interrupting passage 58 through a plurality of pairs of inlet passages 59 to strike the interrupting arc 54. After striking the interrupting arc 54, the oil passes through a plurality of orifices 60, to pass out of the unit 40 through a plurality of opposed pairs of vent passages 61, more clearly shown in Fig. 4. Extinction of the interrupting arc 54 soon follows, and the circuit is interrupted.

The operating mechanism 29 for the circuit interrupter 30 will now be described. As mentioned, the operating arm 28 is rotated about its pivot 62 through operation of the actuating rod 22, the latter carrying a cam follower 20 which rides in the cam slot 19. Thus, rotation of the cam support 17 by the connecting rod 16 will effect reciprocating vertical motion of the actuating rod 22, and thus rotation of the operating arm 28 about its pivot 62. Clockwise rotation of operating arm 28, as viewed in Fig. 4, will cause opening of the contact structure within the arc-extinguishing unit 40, as will be hereinafter described. Counterclockwise rotation of the operating arm 28 about its pivot 62 will effect closing of the contact structure within the arc-extinguishing unit 40, as will be more fully described hereinafter.

Figure 13:
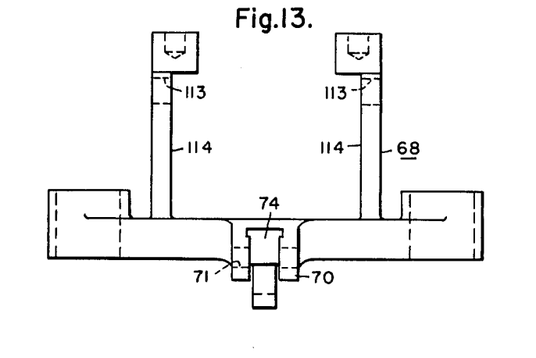
Fig. 13 is a side elevational view of an actuating member utilized in our improved operating mechanism.
Figure 14:
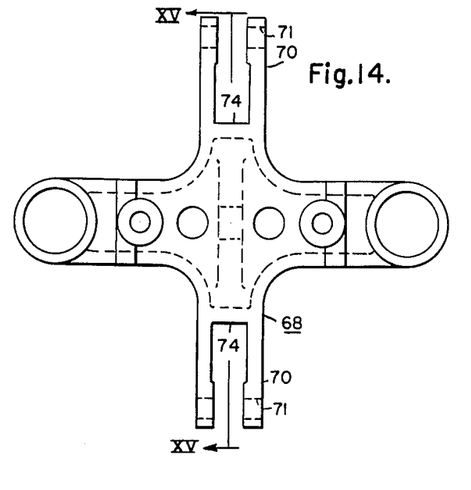
Fig. 14 is a top plan view of the actuating member of Fig. 13.
Figure 15:
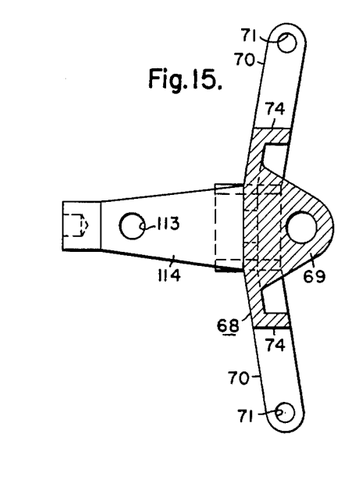
Fig. 15 is a sectional view taken along the line XV—XV of Fig. 14.

The operating arm 28 is attached to a plate 63, the latter being secured to a sylphon bellows 64 to prevent oil passing out of the cylindrical metallic housing 65 supporting the casing 33. The right-hand end of the operating arm 28, as viewed in Fig. 4, is pivotally connected to links 66, the latter being pivotally connected, as at 67, to an actuating member 68, more clearly shown in detail in Figs. 13-15 of the drawings. As illustrated in Figs. 13-15, the actuating member 68 is a suitably configured casting, having a downwardly extending extension 69, more clearly shown in Fig. 15. The upper ends of the links 66 are pivotally connected to this apertured extension 69 by the pin 67.

The actuating member 68 is also provided with a pair of opposed yoke portions 70 having apertures 71 provided therein. A pair of cam rollers 72 are pivotally mounted on pins 73, the latter extending through the apertures 71 provided in the yoke portions 70. Passing through the yoke portions 70 adjacent the bight portions 74 thereof is a pair of latches 75, more clearly shown in Figs. 11 and 12.

Figure 11:
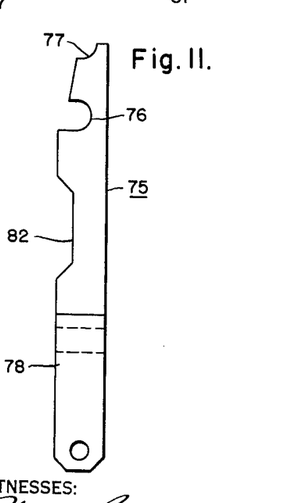
Fig. 11 is a side elevational view of our improved latch.
Figure 12:
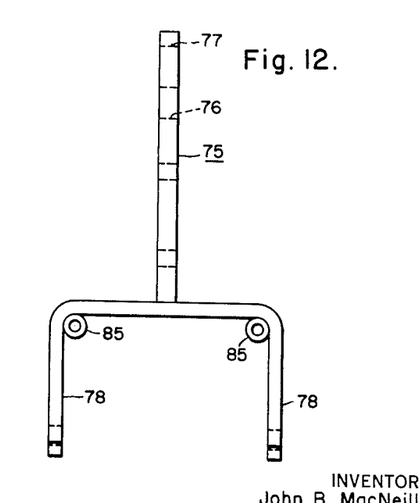
Fig. 12 is a rear elevational view of our improved latch.

Referring to Figs. 11 and 12, it will be noted that the latches 75 have provided therein a closing notch 76 and an opening notch 77. The latch 75 has a pair of legs 78 apertured at their lower ends to receive support pins 79 (Fig. 4), the latter passing through lugs 80, four of which are provided upon a support plate 81 more clearly shown in Fig. 7. The support plate 81 is fixed in position.

The latches 75 are also provided with a cam slot 82 (Fig. 11) which cooperates with the cam rollers 72 in a manner more fully described hereinafter. Also, the pair of latches 75 is biased apart by a pair of compression springs 83 encircling a pair of spring guide rods 84, the latter being guided within cylinders 85 (Fig. 12), the latter being welded to the legs 78 in a manner more clearly shown in Fig. 12.

Thus, the latches 75, biased apart by the springs 83 are only free to move apart when the cam rollers 72 are moved upwardly by the actuating member 68, so that the cam rollers 72 may fall into the cam slots 82 provided in the pair of latches 75.

A pair of metallic support rods 87 is threadedly secured in the support plate 88 (Fig. 4). The support rods 87 have a pair of spacing sleeves 89 threaded thereon so that the support plate 81, through which the rods 87 extend (Fig. 7), is fixed in position. The support plate 81 also has a cutout portion 90 provided therein to accommodate motion of the operating arm 28 and the links 66.

A second set of spacing sleeves 91 (Fig. 7) encircle the support rods 87, and serve to stationarily position a guide support member 92, more clearly shown in Figs. 9 and 10.

Referring to Figs. 9 and 10, the guide support member 92 includes a pair of upstanding guide slots 93, the purpose for which will be more apparent hereinafter. Also, the guide support member 92 has a horizontally extending plate portion 94 with apertures 95 provided at the extremities thereof. The support rods 87 extend through the apertures 95 whereas the spacing sleeves 91, having a larger diameter than the apertures 95, serve to fix in position the plate portion 94 and hence the guide support member 92 a fixed distance from the stationary support plate 81 (Fig. 4). A further set of spacing sleeves 96 (Fig. 5) encircles the support rods 87 above the plate portion 94. Nuts 97 threaded on the support rods 87 secure the spacing sleeves 96 in position. The upper ends of the support rods 87 extend through apertures 98 provided in plates 99 provided at the lower end of the arc-extinguishing unit 40, and serve to stationarily center the unit 40 in alignment with the movable interrupting rod contact 52.

Figure 16:
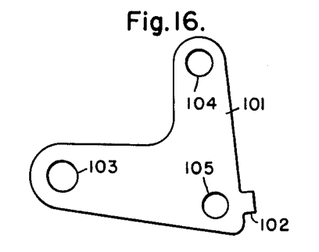
Fig. 16 is a side elevational view of a bell crank utilized in our improved mechanism.
Figure 17:
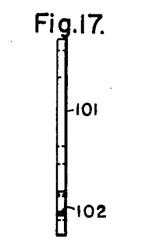
Fig. 17 is an end elevational view of the bell crank in Fig. 16.
Figure 18:
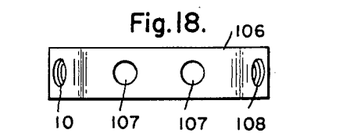
Fig. 18 is a plan view of a spring support utilized in our improved mechanism.
Figure 19:
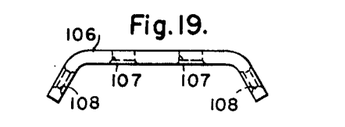
Fig. 19 is a side elevational view of the spring support shown in Fig. 18.

We provide a latch operated lazy tong mechanism 100, which includes two pairs of bell cranks 101, more clearly shown in Figs. 16 and 17. Each bell crank 101 has a lug 102. Each bell crank also has three apertures 103, 104 and 105, the purpose for which will be more apparent hereinafter. Cooperating with each pair of bell cranks 101 is a spring support 106, more clearly shown in Figs. 18 and 19. The spring support 106 has a pair of apertures 107, through which the bosses 102 of a pair of bell cranks 101 extend. Also each spring support 106 has a pair of apertures 108, to which are anchored the ends of a pair of tension springs 109, as more clearly shown in Fig. 6.

Referring to Fig. 6, it will be noted that the spring supports 106 are supported by the pairs of bell cranks 101. The apertures 103 in the bell cranks 101 are mounted upon a stationary pin 110 which passes through an aperture 111 provided in a downwardly extending extension 112 of the stationary guide support member 92, as more clearly shown in Fig. 10. The inner ends of the two sets of tension springs 109 are secured in apertures 113 provided in a pair of upstanding supports 114 integrally formed with the actuating member 68, as more clearly shown in Figs. 13 and 15. A pin 115 extends through the apertures 105 of each set of bell cranks 101. This pin 115 cooperates with the closing and opening notches respectively indicated by the reference characters 76, 77 of the latch 75, in a manner more fully explained hereinafter.

The lazy tong mechanism 100 includes, besides the two sets of bell cranks 101, two pairs of links 116, 117 pivotally connected by pins 118, 119, the latter being guided vertically within the guide slots 93 of the upstanding guide support 120 of the guide support member 92.

The upper pin 119 is pivotally secured to a bifurcated block 120a in which the lower end of the rod-shaped interrupting contact 52 is threaded, and also which is electrically connected by means of a flexible strap 121 to a conductor 122.

The operation of our improved interrupting switch will now be explained. In the closed-circuit position of the switch, the circuit therethrough extends from disconnect jaw contacts 9 through disconnect switch blade 11 through housing 31 to support plate 88. The circuit then extends through conductor 122, through flexible strap 121 through block 120a to interrupting contact 52. The circuit then proceeds through intermediate contact 46 and through stationary contact 44 to the casting support 41. The circuit then extends through the hook extensions 42 to the plate 37 and thence to the line terminal 35.

To open the interrupting switch, crank arm 5 and insulator column 3 are rotated. This immediately effects rotation of the operating arm 28 through the connecting rod 16 and the rotation of the cam support 17. Because of the lost-motion connection 8 between the actuating pins 14b of the rotatable plate 14a and the slots 43 of the rotatable angular crank 56a, the disconnect switch 11 remains closed during the initial portion of the opening operation of the mechanism 29.

The clockwise rotation of operating arm 28, as viewed in Fig. 4, effects downward motion of the actuating member 68 so that the cam rollers 72 in moving downwardly permit latches 75 to move outwardly, thereby placing the opening notches 77 against the pins 115. This locks the bell cranks 101 in their upward closed position, not shown, while the downward motion of the actuating member 68 pulls the inner ends of the tension springs 109 down over the stationary center 110.

At this time the lost-motion travel 8 is dissipated, and the actuating pins 14b cause rotation of the angular crank 56a. As set out in U. S. Patent 2,436,296, there then occurs axial twisting of disconnect switch blade 11 within stationary disconnect contacts 9 to release the contact pressure therebetween and to free any ice, if it exists, at the contacts 9, 10. Simultaneously with this twisting axial rotation of disconnect switch blade 11 the cam rollers 72 move down far enough to force latches 75 inwardly, by the motion of the cam rollers 72 out of the cam slots 82. Thus, the latches 75 will now be forced inwardly toward one another against the biasing action exerted by the pair of compression springs 83. This will effect release of the opening notches 77 from the pins 115 to permit the bell cranks 101 to be snapped to their fully open position, as shown in Fig. 4. The opening speed of the contact structure is multiplied over the rotative opening speed of the bell cranks 101 by the multiplying action of the lazy tong mechanism 100.

Focusing our attention upon what happens to the extinguishing unit 40, it will be observed that initial opening motion of the lower rod-shaped contact 52 will immediately establish a pressure-generating arc 53 between the stationary contact 44 and the intermediate contact 46. This occurs since the intermediate contact 46 is biased downwardly into following engagement with the rod contact 52 by the compression spring 47. However, when shoulder 123 of intermediate contact 46 strikes plate 124, the intermediate contact 46 will be halted, and further downward opening motion of the interrupting contact 52 will cause an interrupting arc 54 to be established between the intermediate and lower movable interrupting contacts 46, 52, respectively. Oil flow takes place in the manner previously described, and the circuit is interrupted. Continued rotation of rotatable insulator column 3 effects upward swinging opening motion of disconnect switch blade 11 to the open position at 32.

It will be noted that disconnect switch blade 11 does not separate from jaw contacts 9 until interrupting contact 52 has been snapped to the open position, shown in Fig. 4, and the circuit interrupted through the circuit interrupter 30. It is only after the circuit has been interrupted within the circuit interrupter 30, that the mechanism housed within the housing 31 is effective to cause disengagement and upward swinging rotative disconnecting motion of the disconnect switch blade 11 away from the jaw contacts 9 to the dot-dash position 32 shown in Fig. 1. Consequently, in the fully open-circuit position, as shown by the dot-dash lines 32 of Fig. 1, and by the full lines in Fig. 4, the interrupter has reached the fully open position with the circuit disconnected.

To effect a closing of the interrupting switch, the crank arm 5 is rotated in the opposite direction, that is, clockwise with reference to Fig. 3. This closing rotative motion of crank arm 5 and rotating insulator stack 3 immediately effects a counterclockwise rotation of operating arm 28 about pivot 62, as viewed in Fig. 4.

During the closing operation, if a disconnect switch blade counterbalancing spring 57 is not used, the weight of the disconnect switch blade 11 will be sufficient to maintain the actuating pins 14b against the ends of the slots 43 of angular crank 56a, and the disconnect switch blade 11 begins immediately to move in a counterclockwise direction about the pivot pins 12 of Fig. 1 from the open position 32.

The disconnect contacts 9, 11 will then close before closing of the circuit through the circuit interrupter 30, and the lost-motion 8 will then begin to be dissipated. Meanwhile the actuating member 68 moves upwardly permitting the cam rollers 72 to ride in the cam slots 82 to permit the latches 75 to move outwardly. The outward movement of the latches 75 causes the closing notches 76 to engage the pins 115, locking the bell cranks 101 in a temporarily fixed open position. Meanwhile continued upward movement of the actuating member 68 causes the tension springs 109 to have their inner ends moved above the center position 110 to bring the line of action of the spring force above the center 110.

Now, the lost-motion 8 having been dissipated, the actuating pins 14b strike the other ends of the slots 43, rotate the angular crank 56a and thereby effect axial twisting motion of disconnect switch blade 11 to thereby effect pressure engagement between disconnect contacts 9, 10, as shown in Fig. 1. At the same time, the actuating member 68 has moved upwardly far enough so that the cam rollers 72 ride upwardly out of the cam slots 82 of the latches 75, to thereby force the latches 75 inwardly, against the outward biasing action exerted by the two compression springs 83.

This disengages the closing notches 76 from the pins 115, and immediately permits the bell cranks 101 to snap to their closed position, that is, to rotate in such manner as to bring two pins 125 toward one another. This effects extension of the lazy tong mechanism 100, so that the rod contact 52 flies upwardly within the unit 40 striking the intermediate contact 46 and carrying the latter upwardly with it to engage stationary contact 44, and thereby complete the circuit, the circuit having previously been closed at the disconnect switch contacts 9, 10.

If a counterbalancing spring 57 is used to counterbalance the weight of the disconnect switch blade 11, then at the start of the closing operation the weight of the blade 11 will not keep the actuating pins 14b against the ends of the slots 43, and the lost-motion 8 will begin to become dissipated at the beginning of the closing stroke. This means that the blade 11 will remain open until the actuating pins 14b strike the other ends of the slots 43, during which time the mechanism 29 has functioned to bring the spring force above the stationary center 110.

The net result, in this case using the spring 57, is that the disconnect switch blade 11 will be forced closed at substantially the same time as the circuit is closed within the arc-extinguishing unit 40. At the end of the closing operation, of course, the axial twisting of the blade 11 occurs to bring about pressural engagement between contacts 9, 10.

Referring to Figs. 8 and 20, it will be observed that we have provided a pair of pistons 126 to speed up the interruption of low currents, and to be particularly effective in interrupting magnetizing and line charging currents. Each piston 126 is cylindrical in form and has a shoulder 127 formed thereon to serve as a lower seat for a compression spring 128. Two or more apertures 129 are provided through the piston 126 to permit the entrance of oil into the piston chambers 130. A one-way acting flap valve 131, biased to the closed position over the apertures 129, is provided. The biasing spring 132 seats upon a washer 133 resting upon a pin 134.

During upward charging motion of the pistons 126, as effected by upward motion of the piston rods 135, the valve 131 is forced open by the suction existing below the pistons 126, and oil passes downwardly through the apertures 129 and into the piston chambers 130 below the pistons. During downward working travel of the pistons 126, the valve 131 remains closed over the apertures 129, and oil is pumped downwardly out of the piston chambers 130 and into the pressure-generating chamber 55 to facilitate the extinction of the pressure-generating and interrupting arcs 53, 54.

The connection of the piston rods 135 with the mechanism 29 will now be described. The piston rods 135 extend downwardly through the vertical flow passages 56 (Fig. 8) and have shoulder portions 136 provided thereon. The spring plate 51 fixedly secured to the intermediate contact 46 has apertures 138 provided through the extremities thereof. The reduced portions 139 of the piston rods 135 pass through these apertures 138 in a manner more clearly shown in Fig. 8. The lower ends of the reduced portions 139 separably engage piston posts 141 threadedly secured, as at 140, to the upper ends of the supports 114 of the actuating member 68, as more clearly shown in Fig. 8. Thus, the charging motion of the pistons 126 upwardly occurs over the entire upward closing movement of the actuating member 68.

During the opening operation, the piston charging posts 141 separate from the reduced portions 139, since the piston rods 135 and the pistons 126 are held upwardly by engagement between the plate 51 and the shoulder portions 136. Thus, the pistons 126 are not permitted to move downwardly in a working direction until the contact structure within the unit 40 is opened. When it is opened, the intermediate contact 46 will rapidly move downwardly carrying with it the plate 51. The piston rods 135 and pistons 126 will only then be free to move downwardly, and depending upon the pressure conditions then existing within the unit 40, may function or be stalled. If the pressure is high within the unit 40, that is, if high amperage currents are being interrupted, the pressure generated at the pressure-generating arc 53 will be adequate to quickly effect the extinction of the interrupting arc 54, and because of such high pressure conditions, the pistons 126 and the piston rods 135 may be stalled. In such event they will only move downwardly upon a subsidence of the pressure within the unit 40, and in so doing will send a flushing flow of oil downwardly through the pressure-generating chamber 55 and through the two vertical flow passages 56, into the interrupting passage 58 and out through the vent passages 61.

Assuming, however, that magnetizing currents or line charging currents are being interrupted, in which case the amperage involved is small, the pressure then existing within the arc-extinguishing unit 40 will correspondingly be small, and the pistons 126 will then be forced downwardly by the compression springs 128 to assist the pressure generated at the pressure-generating arc 53 in effecting rapid extinction of the interrupting arc 54 within the interrupting passage 58. Consequently, the pistons 126 will move downwardly rapidly during low current interruption and may be stalled during high current interruption.

From the foregoing, it will be apparent that we have provided an improved simple and highly effective interrupting switch which incorporates an effective arc extinguishing action with the desired disconnecting motion. The interrupter 30 and the disconnecting switch are both operated from a single mechanism. The time delay involved in the disconnecting switch mechanism by a lost-motion lever system 8 and then by axially rotating the switch blade 11 is utilized in the circuit interrupter 30 to bring the line of action of the tension springs 109 over the center position 110 and effect opening of the contact structure before the disconnect switch blade 11 separates from the stationary jaw contacts 9. It will be observed that the speed of contact motion is independent of the speed of rotation of the insulator stack 3, since it depends entirely upon the snap opening motion of the lazy tong mechanism 100, which is actuated entirely by the four tension springs 109.

During the closing operation, the disconnect switch blade 11 may strike the jaw contacts 9 before or at substantially the same time that the contact structure is reclosed within the extinguishing unit 40, as hereinbefore described.

It will be observed that the piston charging motion occurs over the entire upward travel of the actuating member 68. During the opening operation, the piston travel is dependent entirely upon the opening of the contact structure because of the use of the spring plate 51 attached to the intermediate contact 46. Thus, the actuation of the piston structure is dependent entirely upon the opening of the contact structure, and is in no way dependent upon downward opening motion of the actuating member 68.

The lazy tong mechanism 100 provides a desirable high speed multiplying action and is simple and effective. The pins 118, 119 interconnecting the links 116, 117, are guided in the guide slots 93 to effect a desirable straight line reciprocating motion of the movable rod-shaped interrupting contact 52. The latches 75 temporarily latch the pins 115 during the opening and closing operations until the line of action of the tension springs 109 is over the center position 110. When the latches 75 are released by operation of the cam rollers 72, there results high speed snap opening or snap closing of the lazy tong mechanism 100 and hence of the contact structure.

Although we have shown and described a specific structure, it is to be clearly understood that the same was merely for the purpose of illustration, and that changes and modifications may readily be made therein by those skilled in the art, without departing from the spirit and scope of the appended claims.

We claim as our invention:

1. A circuit interrupter including a pair of relatively movable contacts, a lazy-tong mechanism for actuating one of the contacts and having a fixed pivot as a center associated therewith, and spring means for biasing the lazy-tong mechanism over the fixed center to effect opening and closing motions of the contacts.

2. A circuit interrupter including a pair of relatively movable contacts, a lazy-tong mechanism for actuating one of the contacts and having a fixed pivot as a center associated therewith, spring means for biasing the lazy-tong mechanism over the fixed center to effect opening and closing motions of the contacts, and latching means for holding the lazy-tong mechanism stationary until the line of action of the spring means is overcenter.

3. A circuit interrupter including a pair of relatively movable contacts, a lazy-tong mechanism for actuating one of the contacts and having a fixed pivot as a center associated therewith, spring means for biasing the lazy-tong mechanism over the fixed center to effect opening and closing motions of the contacts, latching means for holding the lazy-tong mechanism stationary until the line of action of the spring means is overcenter, and releasing means for the latching means operable at a predetermined position in the opening and closing motions.

4. A circuit interrupter including a pair of relatively movable contacts, a lazy-tong mechanism for actuating one of the contacts having a pair of bell cranks pivoted about a fixed center, an actuating member, spring means connected to the bell cranks and the actuating member and movable to the overcenter position by the actuating member, and the extension and contraction of the lazy-tong mechanism effecting opening and closing motions of the contacts.

5. A circuit interrupter including a pair of relatively movable contacts, a lazy-tong mechanism for actuating one of the contacts having a pair of bell cranks pivoted about a fixed center, an actuating member, spring means connected to the bell cranks and the actuating member and movable to the overcenter position by the actuating member, the extension and contraction of the lazy-tong mechanism effecting opening and closing motions of the contacts, and latching means for holding the lazy-tong mechanism stationary until the line of action of the spring means is overcenter.

6. A circuit interrupter of the liquid break type having contact structure including a movable contact, a snap-acting mechanism for closing the contact structure, a movable actuating member independent of the contact structure and movable with the snap-acting mechanism, a liquid driving piston, a separable connection between the piston and the actuating member, the actuating member charging the piston during the closing operation during the charging of the snap-acting mechanism, and holding means movable with the movable contact for holding the piston charged until movement of the movable contact.

7. A circuit interrupter of the liquid break type including a movable contact, a movable actuating member, a snap-acting mechanism interconnecting the movable contact and the actuating member, a liquid driving piston, a separable connection between the piston and the actuating member, the actuating member charging the piston during the closing operation while energizing the snap-acting mechanism, and holding means movable with the movable contact for holding the piston charged until movement of the movable contact.

8. A circuit interrupter of the liquid break type including a stationary contact, an intermediate contact, and a movable interrupting contact, a movable actuating member, a snap-acting mechanism interconnecting the actuating member and the movable interrupting contact, a liquid driving piston, means biasing the piston in a direction to move liquid between the contacts, a separable connection between the piston and the actuating member so that the actuating member may charge the piston during closing but move free therefrom during opening, and holding means movable with the intermediate contact for holding the piston charged until opening of the contact structure.

9. A circuit interrupter including a movable interrupting contact and a serially related movable disconnect contact, snap-acting means for opening the movable interrupting contact having a time delay before the actuation thereof, means causing an initial contact pressure releasing movement of the movable disconnect contact before the opening thereof, and interconnecting means connecting the aforesaid two means so that the said releasing movement of the movable disconnect contact occurs during said time delay.

10. A circuit interrupter including a movable interrupting contact and a serially related movable disconnect contact, snap-acting means for opening the movable interrupting contact having a time delay before the actuation thereof, means causing an initial contact pressure releasing movement of the movable disconnect contact before the opening thereof, and interconnecting means connecting the aforesaid two means so that the said releasing movement of the movable disconnect contact occurs during the passing of said time delay and opening of the snap-acting movable contact.

11. A circuit interrupter including a stationary insulator column having a stationary disconnect contact at the end thereof, a pivotally movable disconnect blade having the free end thereof making contacting engagement with the stationary disconnect contact, a second insulator column for mounting the pivot end of the movable disconnect blade, an interrupting unit having contact means disposed adjacent the pivot end of the movable disconnect blade, delayed snap-acting means for said contact means, and means utilizing the time involved in said delay for effecting twisting axial movement of the movable disconnect blade.

12. A circuit interrupter including a stationary insulator column having a stationary disconnect contact at the end thereof, a pivotally-movable disconnect blade having the free end thereof making contacting engagement with the stationary disconnect contact, insulating means for mounting the pivot end of the movable disconnect blade, a rotatable insulator column for operating the disconnect blade, an interrupting unit having contact means disposed adjacent the pivot end of the movable disconnect blade, a line terminal at the top of the interrupting unit, and mechanical means for operating the contact means through the lower end of the interrupting unit from the rotatable insulator column.

13. A circuit interrupter including a stationary insulator column having a stationary disconnect contact at the end thereof, a pivotally movable disconnect blade having the free end thereof making contacting engagement with the stationary disconnect contact, means for actuating the movable disconnect blade, a second insulator column for mounting the pivot end of the movable disconnect blade, an interrupting unit having contact means disposed adjacent the pivot end of the movable disconnect blade, snap-acting means for actuating the contact means, means mechanically interconnecting the snap-acting means and the actuating means, and only a single insulator enclosing the interrupting unit and extending upwardly adjacent the pivoted end of the disconnect switch blade.

14. A circuit interrupter including a stationary insulator column having a stationary disconnect contact at the end thereof, a pivotally movable disconnect blade having the free end thereof making contacting engagement with the stationary disconnect contact, means for twisting the disconnect blade longitudinally and then pivoting the free end thereof away from the stationary disconnect contact to afford an isolating gap therebetween, a second insulator column for mounting the pivot end of the movable disconnect blade, an interrupting unit including contact means extending upwardly adjacent the pivot end of the blade and having a line terminal at the upper end thereof, snap-acting means for actuating the contact means, means mechanically interconnecting the snap-acting means with the twisting and pivoting means, and only an insulating casing about the interrupting unit disposed between the line terminal and the pivot end of the blade.

15. A circuit interrupter of the liquid break type including a movable contact, a movable actuating member, a snap-acting mechanism interconnecting the movable contact and the actuating member, a liquid driving piston, a separable connection between the piston and the actuating member, the actuating member charging the piston during the closing operation while energizing the snap-acting mechanism, and holding means responsive to motion of the movable contact for holding the piston charged until movement of the movable contact.

16. A circuit interrupter including a stationary insulator column having a stationary disconnect contact at the end thereof, a pivotally-movable disconnect blade having the free end thereof making contacting engagement with the stationary disconnect contact, insulating means for mounting the pivot end of the movable disconnect blade, a rotatable insulator column for operating the disconnect blade, an interrupting unit having contact means disposed adjacent the pivot end of the movable disconnect blade, a line terminal at the top of the interrupting unit, mechanical means for operating the contact means through the lower end of the interrupting unit from the rotatable insulator column, said mechanical means including mechanism causing separation of the contact means in the interrupting unit prior to breaking of the electrical circuit between the stationary disconnect contact and the pivotally-movable disconnect blade during rotation of the rotatable insulator column in one direction, and said contact means in the interrupting unit remaining separated until the rotatable insulator column is rotated in the opposite direction and then returning to engaged position.

References Cited in the file of this patent

UNITED STATES PATENTS

| | | |
|---|---|---|
| 620,930 | Johnston | Mar. 14, 1899 |
| 1,123,870 | Haskins | Jan. 5, 1915 |
| 1,429,275 | Burnham | Sept. 19, 1922 |
| 1,647,010 | Marston | Oct. 25, 1927 |
| 1,706,746 | Rice | Mar. 26, 1929 |
| 1,988,120 | Hillebrand | Jan. 15, 1935 |
| 2,102,768 | Trencham et al. | Dec. 21, 1937 |
| 2,344,113 | Schultz | Mar. 14, 1944 |
| 2,365,082 | Jansson | Dec. 12, 1944 |
| 2,444,765 | Boisseau et al. | July 6, 1948 |
| 2,445,442 | Leeds et al. | July 20, 1948 |
| 2,481,996 | Grunewald et al. | Sept. 13, 1949 |
| 2,490,624 | Forwald | Dec. 6, 1949 |
| 2,509,311 | Oaks | May 30, 1950 |
| 2,520,036 | Gussow et al. | Aug. 22, 1950 |
| 2,527,924 | Fjell Stedt et al. | Oct. 31, 1950 |
| 2,566,095 | Scarpa | Aug. 28, 1951 |
| 2,606,262 | Bartlett | Aug. 5, 1952 |

FOREIGN PATENTS

| | | |
|---|---|---|
| 500,731 | Great Britain | Feb. 13, 1939 |